United States Patent
Chan et al.

(10) Patent No.: US 9,542,182 B2
(45) Date of Patent: Jan. 10, 2017

(54) STANDARDIZATION OF VARIABLE NAMES IN AN INTEGRATED DEVELOPMENT ENVIRONMENT

(71) Applicant: INTERNATIONAL BUSINESS MACHINES CORPORATION, Armonk, NY (US)

(72) Inventors: Philip S. P. Chan, Marrickville (AU); Laurence A. Hey, Manly (AU); William J. Izard, Sydney (AU); Matthew J. Ponsford, Manly (AU)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 13/920,639

(22) Filed: Jun. 18, 2013

(65) Prior Publication Data
US 2014/0372982 A1    Dec. 18, 2014

(51) Int. Cl.
*G06F 9/44*        (2006.01)

(52) U.S. Cl.
CPC .. *G06F 8/72* (2013.01); *G06F 8/20* (2013.01)

(58) Field of Classification Search
CPC ........ G06F 11/3624; G06F 8/443; G06F 8/43; G06F 11/3604; G06F 8/30; G06F 8/41; G06F 2212/452; G06F 9/30014; G06F 21/563
See application file for complete search history.

(56) References Cited

U.S. PATENT DOCUMENTS

| | | | |
|---|---|---|---|
| 6,110,224 A * | 8/2000 | Kawabe | G06F 11/3604 714/E11.209 |
| 6,167,566 A * | 12/2000 | Matsuo | G06F 8/433 717/112 |
| 6,249,910 B1 | 6/2001 | Ju et al. | |
| 7,426,714 B1 * | 9/2008 | McCormack | G06Q 10/109 705/7.22 |
| 8,177,122 B2 * | 5/2012 | Dravnieks | G06F 11/3624 235/375 |
| 8,413,113 B2 * | 4/2013 | Gutfleisch | 717/113 |

(Continued)

FOREIGN PATENT DOCUMENTS

| JP | 62282329 A | 12/1987 |
|---|---|---|
| JP | 03172928 A | 7/1991 |

OTHER PUBLICATIONS

Santanu Paul et al.; A Framework for Source Code Search Using Program Patterns; 1994 IEEE; pp. 463-475; <http://ieeexplore.ieee.org/stamp/stamp.jsp?tp=&arnumber=295894>.*

(Continued)

*Primary Examiner* — Thuy Dao
*Assistant Examiner* — Cuong V Luu
(74) *Attorney, Agent, or Firm* — Maeve Carpenter

(57) ABSTRACT

A method for providing for standardization of variable names in an integrated development environment is provided. The method includes scanning a project source code for variable names, where the project source code is managed by a development team in an integrated development environment. The method includes determining that the project source code contains a non-standard variable name, where the distinction between a standard variable name and the non-standard variable name is defined by a set of standards and semantic rules. The method then includes identifying a location of the non-standard variable name in the project source code.

14 Claims, 3 Drawing Sheets

(56) References Cited

U.S. PATENT DOCUMENTS

| | | | | |
|---|---|---|---|---|
| 9,081,463 | B2* | 7/2015 | Taylor | G06F 9/45529 |
| 9,189,244 | B2* | 11/2015 | McMahon | G06F 21/60 |
| 2001/0016939 | A1* | 8/2001 | Fujikawa | 717/4 |
| 2006/0100975 | A1* | 5/2006 | McMaster | G06F 8/24 |
| 2006/0265690 | A1* | 11/2006 | Motoyama | G06F 8/10 717/117 |
| 2008/0086721 | A1* | 4/2008 | Dravnieks | G06F 11/3624 717/124 |
| 2008/0313608 | A1* | 12/2008 | Cowtan | G06F 8/44 717/109 |
| 2009/0030902 | A1 | 1/2009 | Aharoni et al. | |
| 2009/0094667 | A1* | 4/2009 | Habeck | G06F 21/6218 726/1 |
| 2010/0131925 | A1* | 5/2010 | Gutfleisch | G06F 8/70 717/113 |
| 2010/0325619 | A1* | 12/2010 | Song | G06F 8/443 717/143 |
| 2011/0320876 | A1 | 12/2011 | Klein et al. | |
| 2012/0192151 | A1* | 7/2012 | Parkes | G06F 8/34 717/120 |
| 2014/0289702 | A1* | 9/2014 | McMahon | G06F 21/60 717/120 |
| 2014/0304682 | A1* | 10/2014 | Taylor | G06F 9/45529 717/113 |

OTHER PUBLICATIONS

Greg J. Badros; JavaML a markup language for Java source code; 2000 Elsevier; pp. 159-177; <http://www.sciencedirect.com/science/article/pii/S1389128600000372>.*

Shigeru Chiba; A Metaobject. Protocol for C++ ; 1995 ACM; pp. 285-299; <http://dl.acm.org/citation.cfm?id=217868>.*

John Viega et al.; A Static Vulnerability Scanner for C and C++ Code; 2000 IEEE; pp. 257-267; <http://ieeexplore.ieee.org/stamp/stamp.jsp?tp=&arnumber=898880>.*

David Kranz et al.; ORBIT An Optimizing Compiler for Scheme; 1986 ACM; pp. 219-233; <http://dl.acm.org/citation.cfm?id=13333>.*

Maya B. Gokhale et al.; NAPA C Compiling for a Hybrid RISC/FPGA Architecture; 1998 IEEE; 10 pages; <http://ieeexplore.ieee.org/stamp/stamp.jsp?tp=&arnumber=707890>.*

Clark, M., "Eclipse Community Forums:Newcomers >> access variable name suggestions during refactoring". Copyright 2011 The Eclipse Foundation. [online] [Retrived on: Mar. 4, 2013] Retrieved from the internet: <http:www.eclipse.org/forums/index.php/m/493566/.

FMS. "Total Visual Code Tools—Summary". Copyright 1996-2013 ComponentSource. [online] [Retrieved on: Mar. 4, 2013]. Retrieved from the internet <http:/www.componentsource.com/products/fms-total-visual-code-tool . . . >.

\* cited by examiner

STANDARDIZATION OF VARIABLE NAMES IN AN INTEGRATED DEVELOPMENT ENVIRONMENT

FIELD OF THE INVENTION

The present invention relates generally to the field of software development and management, and more particularly to standardization of variable names in an integrated development environment.

BACKGROUND OF THE INVENTION

Within a software development team, standardization of the way code is written allows for easier reading and maintaining of the code because developers can become familiar with a new code component more quickly if it is written in a standardized style. Integrated Development Environments ("IDEs") often enforce certain standards, for example, a Java® IDE will warn a developer that object types should have a name that begins with a capital letter. Development teams often have standards for variable naming as well, however, IDEs do not currently enforce these standards.

SUMMARY

Embodiments of the present invention disclose a method, computer program product, and computer system for providing for standardization of variable names in an integrated development environment. The method includes scanning, by one or more computer processors, a project source code for variable names, the project source code managed by a development team in an integrated development environment. The method includes determining, by the one or more computer processors, that the project source code contains a non-standard variable name, the distinction between a standard variable name, and the non-standard variable name defined by a set of standards and semantic rules. The method then includes identifying a location of the non-standard variable name in the project source code.

DETAILED DESCRIPTION

Figure 1:
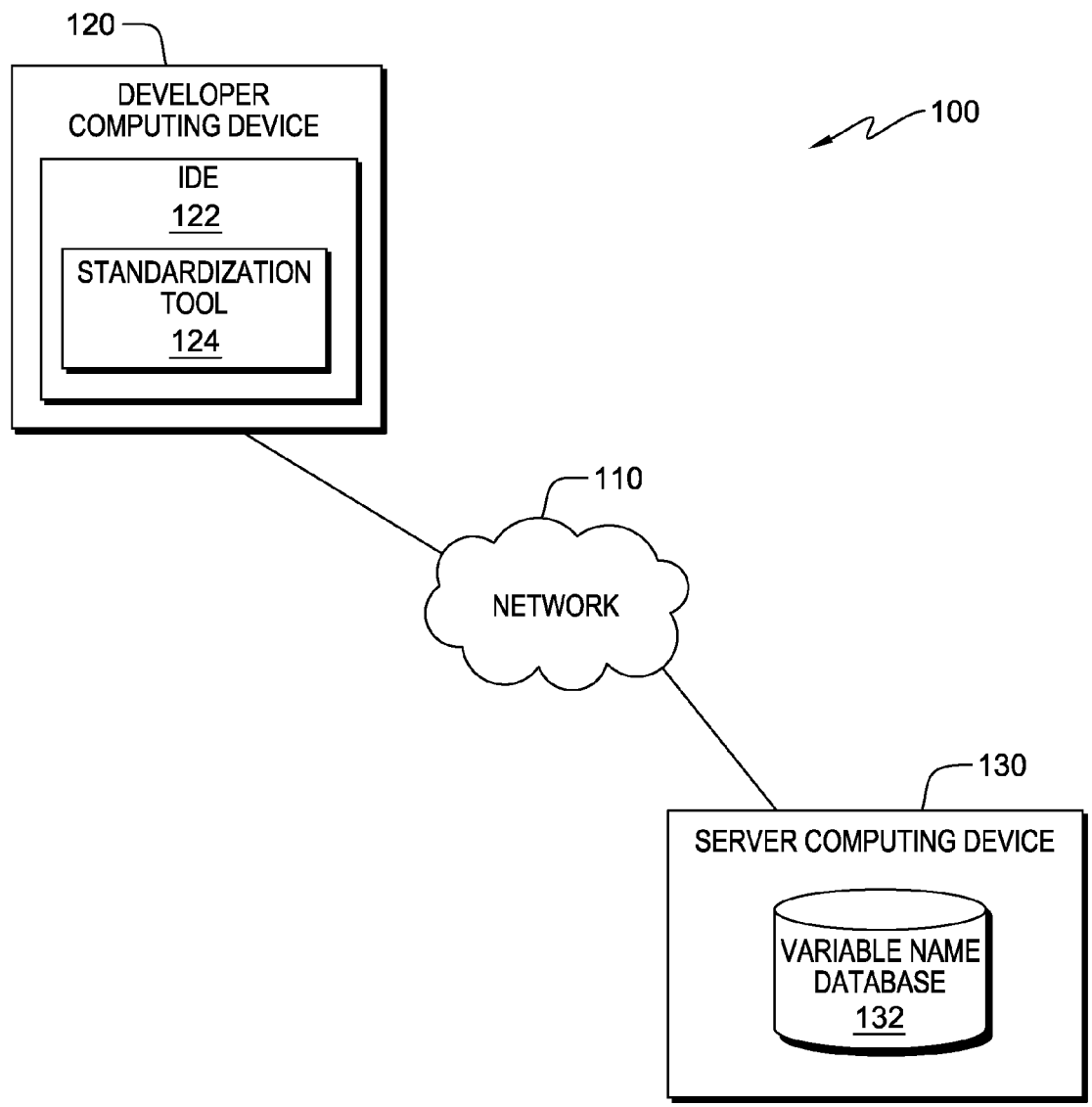
FIG. 1 is a functional block diagram illustrating a development team environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable storage medium(s) having computer readable program code/instructions embodied thereon.

Any combination of computer-readable storage media may be utilized. A computer-readable storage medium may be, for example, but not limited to, an electronic, magnetic, optical, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine such that the instructions which execute via the processor of the computer or other programmable data processing apparatus, create means for implementing the functions/acts specified in the flowchart and/or block diagram block or blocks.

These computer program instructions may also be stored in a computer-readable storage medium that can direct a computer, other programmable data processing apparatus, or other devices to function in a particular manner such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a development team environment, generally designated 100, in accordance with one embodiment of the present invention.

Development team environment 100 includes developer computing device 120 and server computing device 130, all interconnected over network 110. Network 110 can be, for example, a local area network (LAN), a wide area network (WAN) such as the Internet, or a combination of the two, and can include wired, wireless, or fiber optic connections. In general, network 110 can be any combination of connections and protocols that will support communications between developer computing device 120 and server computing device 130.

Developer computing device 120 includes IDE 122 and standardization tool 124. In various embodiments of the present invention, developer computer device 120 can be a laptop computer, a notebook computer, a personal computer, a desktop computer, a tablet computer, a handheld computing device or smart phone, a thin client, a mainframe computer, a networked server computer, or any programmable electronic device capable of development of a software product, including computer programming, research, prototyping, modification, and maintenance, and capable of communicating with other computing devices within development team environment 100. While developer computing device 120 is shown as a single device, within development team environment 100 there can be multiple developer computing devices communicating with each other and with server computing device 130 via network 110. Developer computing device 120 may include internal and external components, as depicted and described with respect to FIG. 3.

IDE 122 is a software application providing capabilities and facilities to developers and computer programmers for software development. IDEs present a single environment in which all development is done. An IDE normally consists of a source code editor, build automation tools and a debugger and typically provides many additional features for authoring, modifying, compiling, deploying and debugging software. Standardization tool 124 is a feature, add-on, or plugin in IDE 122 that scans a project's source code for standard variable names, according to standards and semantic rules defined by a development team, described in more detail below, and builds or adds to a database of the standard variable names, for example, variable name database 132 described below. Standardization tool 124 also generates a notification of non-standard variable names found in the project source code. A developer, programmer, or some other member of the development team can review the non-standard variable name and either correct the variable name, or add the variable name to the database. The database is editable by the development team, such as those operating on developer computing device 120 and similar such devices within development team environment 100, and allows variable names to be defined appropriately and according to the standard of the team and for the problem domain in which IDE 122 is operating.

Server computing device 130 includes variable name database 132. In various embodiments of the present invention, server computing device 130 can be a laptop computer, a notebook computer, a personal computer, a desktop computer, a tablet computer, a handheld computing device or smart phone, a thin client, a mainframe computer, a networked server computer, or any programmable electronic device capable of communicating with developer computing device 120. Variable name database 132 stores standard or allowed variable names by object type, as determined and defined by the development team for the problem domain and according to the standards of the development team. While in FIG. 1, variable name database 132 is located on server computer device 130, one of skill in the art will appreciate that, in other embodiments, variable name database 132 can be located elsewhere within development team environment 100 and can be accessible to users of developer computing devices within development team environment 100 via network 110.

Figure 2:
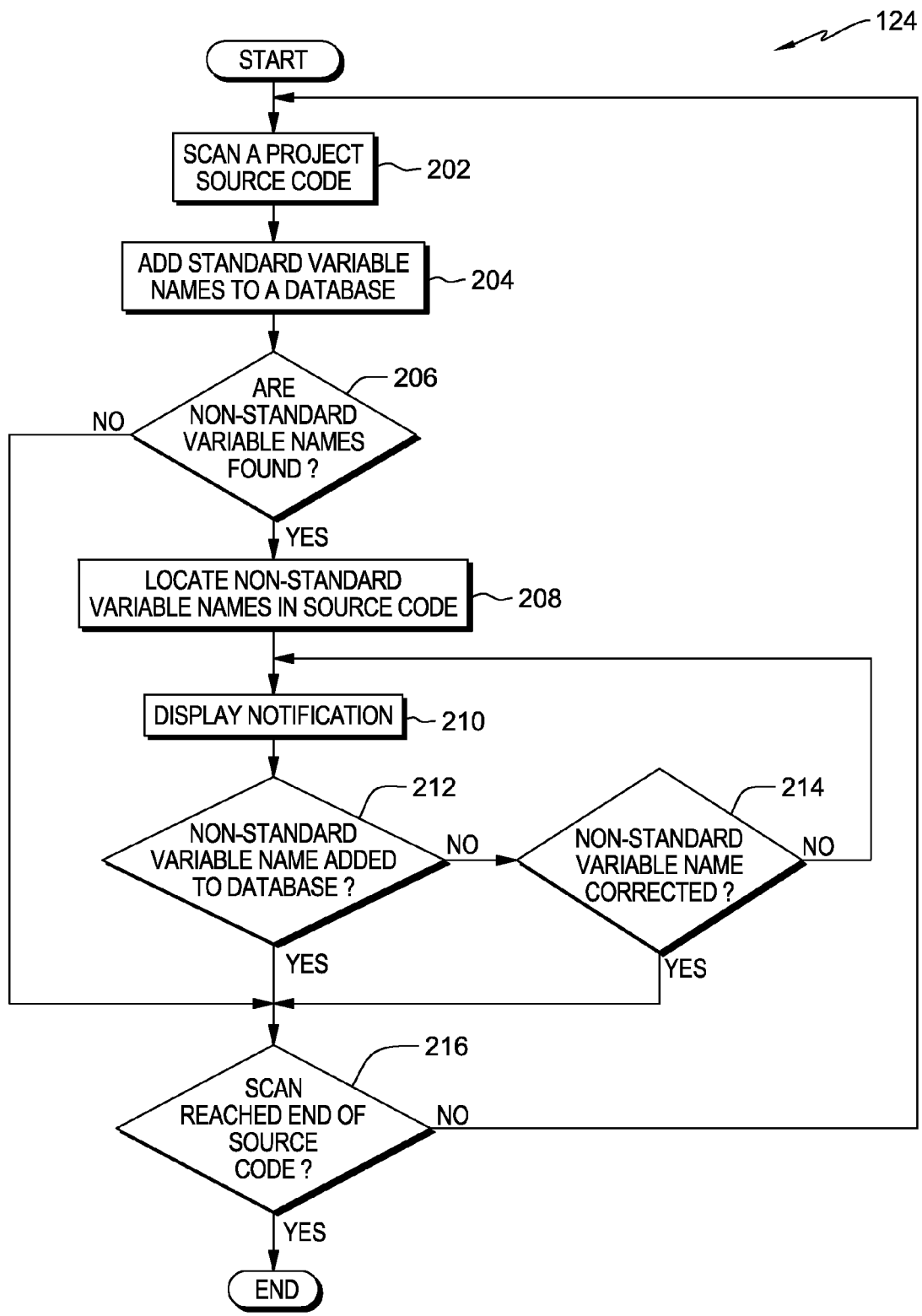
FIG. 2 is a flowchart depicting operational steps of a standardization tool for allowing standardization of variable names in an IDE, in accordance with an embodiment of the present invention.

FIG. 2 is a flowchart depicting operational steps of standardization tool 124 for allowing standardization of variable names in an IDE, such as IDE 122, in accordance with an embodiment of the present invention.

Standardization tool 124 scans a project source code (step 202). In an IDE, such as IDE 122 on developer computing device 120, standardization tool 124 scans a project's source code for standard names for variables based on object type. In various embodiments of the present invention, standardization tool 124 scans the source code using facilities available in IDE 122 for extracting object types and variable names based on an understanding of syntax of each particular programming language. For example, given "ItemTemplate itemTemplate=new ItemTemplate( )" and "ItemTemplate folderTemplate=TemplateFactory.getFolder-Template( )" in the project source code, standardization tool 124 would recognize "itemTemplate" and "folderTemplate" as variable names for the object type "ItemTemplate." In an alternate embodiment of the present invention, standardization tool 124 can scan the project source code for standard method names, such as "getFolderTemplate" in the example above.

Standardization tool 124 adds standard variable names to a database (step 204). Based on the scan of the project source code, standardization tool 124 builds a database of standard variable names, such as variable name database 132. Variable names are stored in variable name database 132 on a per project, per development, team basis. In various embodiments of the present invention, standardization tool 124 can recognize inflections, or mutations, to a root word in the database based on context. For example, if a variable name for the object type "User" can be "user", a list of users, "List<User>" would allow the variable name "users." Additionally, standardization tool 124 can recognize inheritance relationships, for example, if object type "Cat" extends to object type "Animal", an allowable variable name for an "Animal" would be "Cat", since it is an allowable variable name for the object type "Cat." In an exemplary embodiment of the present invention, a developer or programmer using IDE 122 can edit the database, for example, variable name database 132, through an interface by removing, adding, or editing variable names based on standards defined by the development team operating within development team environment 100.

In an alternate embodiment of the present invention, instead of storing variable names, the database can contain general rules for variable names. For example, a "regular expression (regex)" style rule could state "*Template", which would allow the project source code to contain any variable name ending in "Template."

Standardization tool 124 determines whether non-standard variable names are found in the scan (decision block 206). The distinction between standard and non-standard variable names is determined, or defined, according to standards and semantic rules defined by the development team. For example, "ItemTemplate it=getTemplate( )" is a non-standard variable name for the project source code because "it" is not a defined name for an "ItemTemplate" within development team environment 100. If non-standard variable names are not found (decision block 206, "no" branch), standardization tool 124 determines whether the scan reached the end of the available source code (decision block 216).

If non-standard variable names are found (decision block 206, "yes" branch), standardization tool 124 locates the non-standard variable names in the source code (step 208). For example, standardization tool 124 may locate "ItemTemplate flderTemplate=getTemplateQ" because the variable name contains a spelling error.

Standardization tool 124 displays a notification indicating the location of a non-standard variable name (step 210). A notification, or other alert or warning, is generated indicating the location of the non-standard variable name in the source code, which calls the non-standard variable name to the developer or programmer's attention. The notification may include, for example, highlighting the location of the non-standard variable name in the source, displaying a window containing a message indicating the location of the non-standard variable name, or any other manner to indicate to the developer or programmer the location of the non-standard variable name.

Standardization tool 124 determines whether the non-standard variable name is added to the database (decision block 212). If the developer or programmer approves the non-standard variable name, either because, for example, it is an appropriate name or it is for a new object type, the developer or programmer, can choose to add the non-standard variable name to the database as a new variable name. In an exemplary embodiment of the present invention, only a developer, programmer, or some other member of the development team with a level of permission corresponding to permission to add, remove, or edit variable names in the database, as designated by the development team, may do so. In various embodiments of the present invention, a developer, programmer, or some other member of the development team with certain levels of permission, as designated by the development team, may choose to suppress the notification upon a determination that the non-standard variable name is appropriate, without adding the variable name to the database.

If the non-standard variable name is not added to the database (decision block 212, "no" branch), standardization tool 124 determines whether the non-standard variable name is corrected in the source code (decision block 214). For example, the developer or programmer may correct a misspelling or incorrect variable name in the project source code. If the non-standard variable name is not corrected (decision block 214, "no" branch), standardization tool 124 continues to display a notification locating the non-standard variable name in the source code (step 210).

If the non-standard variable name is added to the database (decision block 212, "yes" branch), or if the non-standard variable name is corrected in the source code (decision block 214, "yes" branch), standardization tool 124 determines whether the scan reached the end of the source code (decision block 216). If the scan is not at the end of the source code (decision block 216, "no" branch), standardization tool 124 continues to scan the source code (step 202). If the scan is at the end of the source code (decision block 216, "yes" branch), standardization tool 124 no longer scans the source code for variable names and standardization tool 124 ends.

In an embodiment of the present invention, the created database, variable name database 132 in development team environment 100, can be used to standardize new source code by auto-completion of variable names while writing the new source code.

Figure 3:
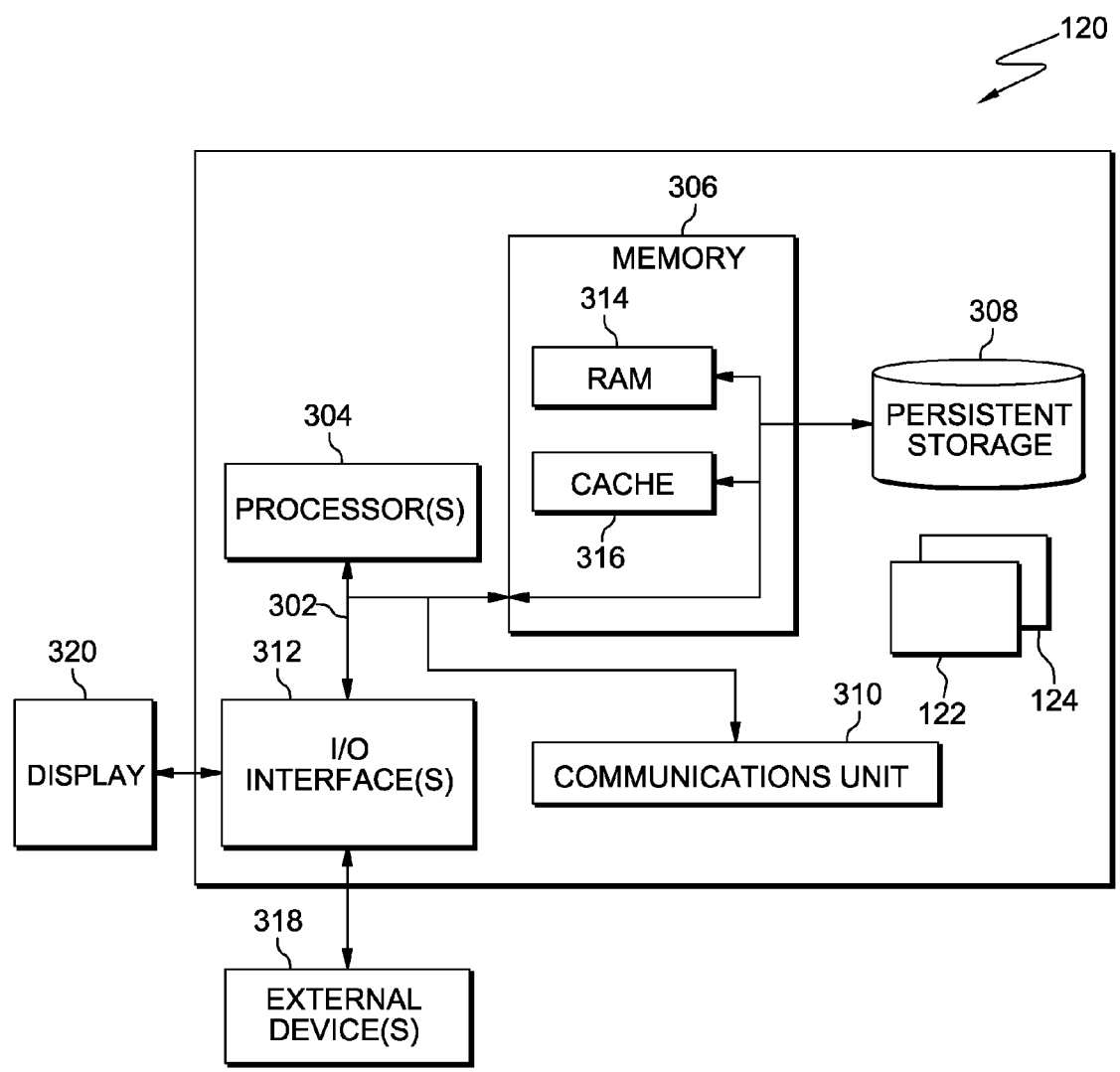
FIG. 3 depicts a block diagram of components of a data processing system, such as the developer computing device of FIG. 1, in accordance with an embodiment of the present invention.

FIG. 3 depicts a block diagram of components of developer computer device 120, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Developer computer device 120 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

IDE 122 and standardization tool 124 are stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including server computing device 130. In these examples, communications unit 310 includes one or more network interface cards. Communications unit 310 may provide communications through the use of either or both physical and wireless communications links. IDE 122 and standardization tool 124 may be downloaded to persistent storage 308 through communications unit 310.

I/O interface(s) 312 allows for input and output of data with other devices that may be connected to developer computing device 120. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., IDE 122 and standardization tool 124, can be stored on such portable computer-readable storage media and can be loaded onto persistent storage 308 via I/O interface(s) 312. I/O interface(s) 312 also connect to a display 320. Display 320 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for providing for standardization of variable names in an integrated development environment, the method comprising:
    scanning, by one or more computer processors, a project source code for variable names, the project source code managed by a development team in an integrated development environment, wherein a variable name is determined based, at least in part, on whether the variable name includes one or more mutations to a root word of a standard variable name, and at least one of one or more inheritance relationships for the standard variable name, and one or more general rules for variable names;
    determining, by the one or more computer processors, the project source code contains a non-standard variable name, wherein the non-standard variable name is a variable name that is not stored as a standard variable name determined by the development team;
    identifying a location of the non-standard variable name in the project source code, the location identified to the development team by a notification and wherein the notification includes at least a highlight of the non-standard variable name;
    determining, by the one or more computer processors, whether the non-standard variable name is added to a database, wherein adding the non-standard variable name in the database indicates approval of the non-standard variable name;
    determining, by the one or more computer processors, the project source code contains one or more standard variable names;
    responsive to determining the project source code contains one or more standard variable names, storing, by the one or more computer processors, the one or more standard variable names in the database; and
    using, by the one or more computer processors, the database to standardize new source code by auto-completion of one or more variable names while the new source code is being written.

2. The method of claim 1, wherein the notification further includes a display of a message indicating the location of the non-standard variable name in the project source code.

3. The method of claim 1, further comprising determining the adding of the non-standard variable name to the database is associated with a level of permission corresponding to permission to add, remove, or edit variable names in the database.

4. The method of claim 1, further comprising:
    determining, by the one or more computer processors, the non-standard variable name is no longer in the project source code; and
    removing the notification from the project source code.

5. The method of claim 1, further comprising determining, by the one or more computer processors, the project source code contains standard method names, the standard method names defined by a set of standards and semantic rules.

6. A computer program product for providing for standardization of variable names in an integrated development environment, the computer program product comprising:
    one or more computer-readable tangible storage devices and program instructions stored on the one or more computer-readable tangible storage devices, wherein the one or more computer-readable tangible storage devices are hardware, and the one or more computer-readable tangible storage devices are not a transitory signal per se, the program instructions comprising:
    program instructions to scan a project source code for variable names, the project source code managed by a development team in an integrated development environment, wherein a variable name is determined based, at least in part, on whether the variable name includes one or more mutations to a root word of a standard variable name, and at least one of one or more inheritance relationships for the standard variable name, and one or more general rules for variable names;
    program instructions to determine the project source code contains a non-standard variable name, wherein the non-standard variable name is a variable name that is not stored as a standard variable name determined by the development team;
    program instructions to identify a location of the non-standard variable name in the project source code, the location identified to the development team by a notification and wherein the notification includes at least a highlight of the non-standard variable name;
    program instructions to determine whether the non-standard variable name is added to a database, wherein adding the non-standard variable name in the database indicates approval of the non-standard variable name;

program instructions to determine the project source code contains one or more standard variable names;

responsive to determining the project source code contains one or more standard variable names, program instructions to store the one or more standard variable names in the database; and program instructions to use the database to standardize new source code by auto-completion of one or more variable names while the new source code is being written.

7. The computer program product of claim 6, wherein the notification further includes a display of a message indicating the location of the non-standard variable name in the project source code.

8. The computer program product of claim 6, further comprising program instructions to determine the adding of the non-standard variable name to the database is associated with a level of permission corresponding to permission to add, remove, or edit variable names in the database.

9. The computer program product of claim 6, further comprising:

program instructions to determine the non-standard variable name is no longer in the project source code; and program instructions to remove the notification from the project source code.

10. The computer program product of claim 6, further comprising program instructions to determine the project source code contains standard method names, the standard method names defined by a set of standards and semantic rules.

11. A computer system for providing for standardization of variable names in an integrated development environment, the computer system comprising:

one or more computer processors;

one or more computer-readable tangible storage media;

program instructions stored on the one or more computer-readable tangible storage media for execution by at least one of the one or more computer processors, the program instructions comprising:

program instructions to scan a project source code for variable names, the project source code managed by a development team in an integrated development environment, wherein a variable name is determined based, at least in part, on whether the variable name includes one or more mutations to a root word of a standard variable name, and at least one of one or more inheritance relationships for the standard variable name, and one or more general rules for variable names;

program instructions to determine the project source code contains a non-standard variable name, wherein the non-standard variable name is a variable name that is not stored as a standard variable name determined by the development team;

program instructions to identify a location of the non-standard variable name in the project source code, the location identified to the development team by a notification, wherein the notification includes at least a highlight of the non-standard variable name;

program instructions to determine whether the non-standard variable name is added to a database, wherein adding the non-standard variable name in the database indicates approval of the non-standard variable name;

program instructions to determine the project source code contains one or more standard variable names;

responsive to determining the project source code contains one or more standard variable names, program instructions to store the one or more standard variable names in the database; and program instructions to use the database to standardize new source code by auto-completion of one or more variable names while the new source code is being written.

12. The computer system of claim 11, further comprising program instructions to determine the adding of the non-standard variable name to the database is associated with a level of permission corresponding to permission to add, remove, or edit variable names in the database.

13. The computer system of claim 11, further comprising:

program instructions to determine the non-standard variable name is no longer in the project source code; and program instructions to remove the notification from the project source code.

14. The computer system of claim 11, further comprising program instructions to determine the project source code contains standard method names, the standard method names defined by a set of standards and semantic rules.

\* \* \* \* \*